United States Patent
Hamada

(10) Patent No.: US 12,299,047 B2
(45) Date of Patent: May 13, 2025

(54) SECRET GROUPING APPARATUS, SECRET GROUPING SYSTEM, SECRET GROUPING METHOD, AND PROGRAM

(71) Applicant: NIPPON TELEGRAPH AND TELEPHONE CORPORATION, Tokyo (JP)

(72) Inventor: Koki Hamada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 254 days.

(21) Appl. No.: 18/246,928

(22) PCT Filed: Oct. 16, 2020

(86) PCT No.: PCT/JP2020/039125
§ 371 (c)(1),
(2) Date: Mar. 28, 2023

(87) PCT Pub. No.: WO2022/079909
PCT Pub. Date: Apr. 21, 2022

(65) Prior Publication Data
US 2023/0401263 A1 Dec. 14, 2023

(51) Int. Cl.
*G06F 16/906* (2019.01)
*G06F 21/60* (2013.01)

(52) U.S. Cl.
CPC .......... *G06F 16/906* (2019.01); *G06F 21/602* (2013.01)

(58) Field of Classification Search
CPC ........ G06F 16/906; G06F 21/602; G06F 7/08; H04L 9/085; H04L 2209/46
See application file for complete search history.

(56) References Cited

U.S. PATENT DOCUMENTS

| 5,627,586 A * | 5/1997 | Yamasaki | H04N 23/61 348/700 |
| 2019/0171211 A1* | 6/2019 | Jang | B60W 50/0098 |
| 2021/0243014 A1 | 8/2021 | Ikarashi | |

FOREIGN PATENT DOCUMENTS

WO 2019/208485 10/2019

OTHER PUBLICATIONS

Mark Abspoel et al: "Secure training of decision trees with continuous attributes", IACR, International Association for Cryptologic Research, vol. 20200921:082138 1 Sep. 17, 2020 (Sep. 17, 2020), pp. 1-21, XP061036437 Retrieved from the Internet. URL:http://eprint.iacr.org/2020/1130.pdf [retrieved on Sep. 17, 2020].

(Continued)

*Primary Examiner* — Quazi Farooqui
(74) *Attorney, Agent, or Firm* — IPUSA, PLLC

(57) ABSTRACT

A secret grouping apparatus which classifies a plurality of elements into one or more groups includes a processor configured to receive a target vector in which the plurality of elements are disposed so that elements belonging to a same group are continuous, a group information vector representing a last element in the group, and a classification destination vector representing a classification destination of each of the elements in the group; calculate a detection vector representing a last element of elements classified into a same classification destination in the group by using the target vector, the group information vector, and the classification destination vector; and stably sort the target vector and the detection vector with respect to the classification destination vector to create a target vector after classifying each of the elements into the classification destination and a group information vector representing a last element in a group after the classification.

7 Claims, 3 Drawing Sheets

(56) References Cited

OTHER PUBLICATIONS

Koji Chida et al., "Lightweight Verifiable 3-Party Concealment Function Computation Reconsideration", In CSS, 2010.

* cited by examiner

SECRET GROUPING APPARATUS, SECRET GROUPING SYSTEM, SECRET GROUPING METHOD, AND PROGRAM

TECHNICAL FIELD

The present invention relates to a secret grouping apparatus, a secret grouping system, a secret grouping method, and a program.

BACKGROUND ART

As a method of obtaining a specific operation result without recovering an encrypted numerical value, a method called secret calculation is known (for example, NPL 1). The method described in NPL 1 can perform encryption by distributing numerical fragments to three secret calculation devices and perform cooperative calculation using the three secret calculation devices to obtain results of addition/subtraction, constant addition, multiplication, constant multiplication, logical operations (negative, logical product, logical sum, exclusive OR), data format conversion (integer and binary), and the like in a state of being distributed in the three secret calculation devices without restoring the numeral values.

Incidentally, there are various techniques for classifying (that is, grouping) a plurality of elements into a plurality of groups. Furthermore, there are also cases in which a plurality of elements which have already been grouped are desired to be classified into smaller groups. For example, grouping of a set of certain attribute values is performed recursively at each node at the time of learning a decision tree.

CITATION LIST

Non Patent Literature

[NPL 1] Koji CHIDA, Koki HAMADA, Dai IGARASHI, and Katsumi TAKAHASHI, "Lightweight Verifiable 3-Party Concealment Function Computation Reconsideration", In CSS, 2010.

SUMMARY OF INVENTION

Technical Problem

However, a long calculation time may be required when grouping is performed by secret calculation. For example, when each element of a vector composed of n number of grouped elements is classified into a finer group, a size of each group is concealed. Thus, in each group, it is necessary to create a vector of size n containing the elements belonging to that group. Therefore, it is necessary to create a vector of magnitude $\Theta(n)$ $\Theta(n)$ times which requires a total calculation time of $\Theta(n^2)$.

An embodiment of the present invention was made in view of the above points, and an object of the present invention is to reduce a calculation time in the case of grouping through secret calculation.

Solution to Problem

In order to achieve the above object, a secret grouping apparatus according to an embodiment is a secret grouping apparatus, which classifies a plurality of elements into one or more groups through secret calculation, includes an input unit configured to receive, as an input, a target vector in which the plurality of elements are disposed so that elements belonging to a same group are continuous, a group information vector representing a last element in the group, and a classification destination vector representing a classification destination of each of the elements in the group; a detection vector calculation unit configured to calculate a detection vector representing a last element of elements classified into a same classification destination in the group by using the target vector, the group information vector, and the classification destination vector; and a classification unit configured to stably sort the target vector and the detection vector with respect to the classification destination vector to create a target vector after classifying elements into the classification destination in the group and a group information vector representing a last element in a group after the classification.

Advantageous Effects of Invention

It is possible to reduce calculation time at the time of grouping through secret calculation.

DESCRIPTION OF EMBODIMENTS

An embodiment of the present invention will be described below. In the embodiment, the secret grouping apparatus 10 capable of efficiently performing the grouping at the time of further grouping pieces of data through secret calculation (that is, data grouped by concealing inputs and outputs) grouped through secret calculation will be described. Note that, in the embodiment, grouping in which inputs and outputs are concealed by using secret calculation is also referred to as "secret grouping". A size of each group (that is, the number of pieces of data belonging to each group) is also concealed in secret grouping.

<Notation>

First, various notations will be described. Note that notations which are not necessarily used in the embodiment will be also described below.

A value in which a certain value a is concealed using encryption, secret sharing, or the like is called a concealed value of a and is described as [a]. When a is concealed using secret sharing, [a] refers to a set of secret sharing fragments possessed by each secret calculation device.

Restoration

A process of inputting a secret value [a] of a and calculating a value c so that c=a is described as c-Open ([a]).

Arithmetic Calculation

The secret values $[c_1]$, $[c_2]$, and $[c_3]$ of the calculation results $c_1$, $c_2$, and $c_3$ of a+b, ab, and ab are calculated using the secret values [a] and [b] of the two values a and b as inputs for each operation of addition, subtraction, and multiplication. Execution of each operation of addition, subtraction, and multiplication is described as $[c_1]$←Add ([a], [b]) $[c_2]$←Sub ([a], [b]) $[c_3]$←Mul ([a], [b]).

If there is no risk of misunderstanding, Add ([a], [b]), Sub ([a], [b]), and Mul ([a], [b]) are abbreviated as [a]+[b], [a]−[b], and [a]×[b].

Comparison

A comparison operation uses secret hidden values [a] and [b] of the two values a and b as inputs and secret values $[c_1]$, $[c_2]$, and $[c_3]$ of a truth value $c \in \{0,1\}$ of a=b, a≤b, and a<b are calculated. The truth value is 1 when it is true and 0 when it is false. The execution of the comparison operation of a=b, a≤b, and a<b is described as $[c_1] \leftarrow$ EQ ([a], [b]), $[c_2] \leftarrow$ LE ([a], [b]), and $[c_3] \leftarrow$ LT ([a], [b]).

Selection

The operation of selection uses the secret value [c] the truth value $c \in \{0,1\}$ and the secret values [a] [b] of the two values a and b as inputs to calculate a secret value [d] in which $$d = \begin{cases} a & \text{if } c = 1 \\ b & \text{otherwise} \end{cases} \quad \text{[Math. 1]}$$

is satisfied. The execution of this operation is described as [d]←IfElse ([c], [a], [b]).

This operation can be realized by [d]←[c]×([a]−[b])+[b].

<Functional Configuration>

Figure 1:
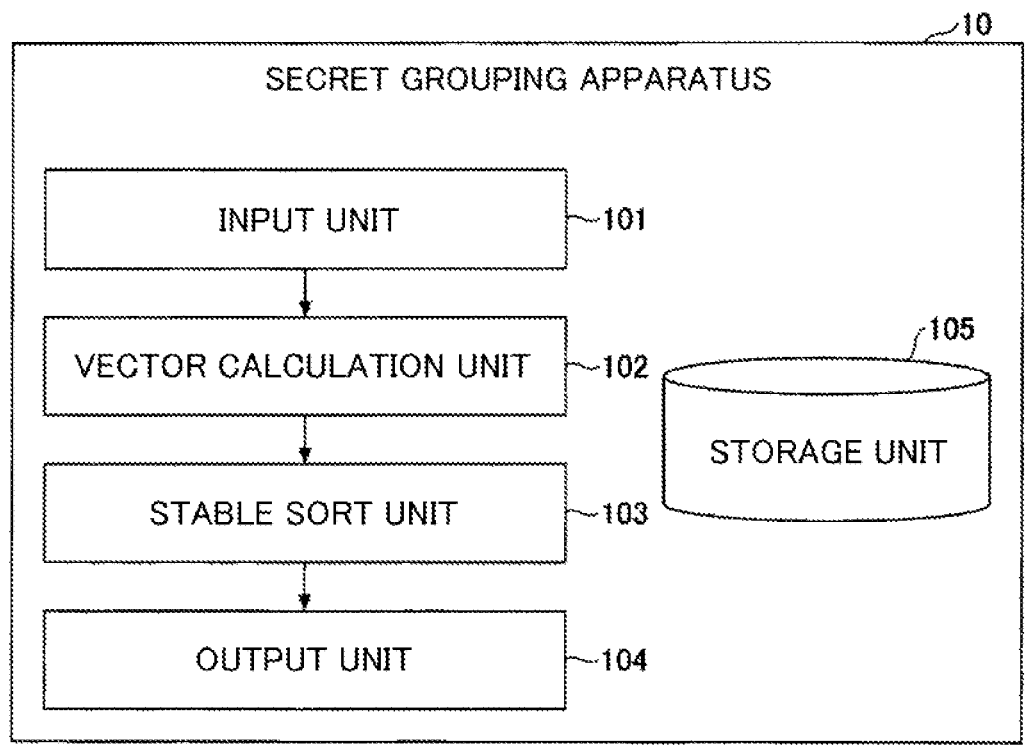
FIG. 1 is a diagram showing an example of a functional configuration of a secret grouping apparatus according to an embodiment.

A functional configuration of the secret grouping apparatus 10 according to the embodiment will be described below with reference to FIG. 1. FIG. 1 is a diagram showing an example of a functional configuration of the secret grouping apparatus 10 according to the embodiment.

As shown in FIG. 1, the secret grouping apparatus 10 according to the embodiment includes an input unit 101, a vector calculation unit 102, a stable sort unit 103, an output unit 104, and a storage unit 105.

Various data (that is, various concealed data) used for secret grouping are stored in the storage unit 105. Here, it is assumed that these various types of data include data composed of a plurality of elements to be grouped, a group information vector representing which group each element included in this data is classified into, and a classification destination vector representing a classification destination when each element included in the data is classified into a finer group in the group. Hereinafter, it is assumed that data composed of a plurality of elements to be grouped is called a data vector and elements belonging to the same group are disposed at continuous positions in the data vector. Furthermore, it is assumed that information indicating whether each element of the data vector is an end point (boundary) of the group is disposed in the group information vector and 1 is provided if the elements of the data vector at the same position are the endpoints of the group and 0 is provided otherwise.

For example, it is assumed that the data vector and the group information vector are [v] and [g], respectively, and [v] and [g] are represented by the following, respectively:

$[v] = (3,2,4,5,1,6,3,2)^T$ $[g] = (0,1,1,0,0,1,0,1)^T.$

Note that T is a symbol representing transposition.

In this case, it means that first and second elements of the data vector [v] belong to a first group, a third element belongs to a second group, fourth to sixth elements belong to a third group, and seventh and eighth elements belong to a fourth group. Furthermore, it is assumed that the second element of the data vector [v] is an end point (boundary) of the first group, and similarly, the third element is an end point of the second group, the six element is an end point of the third group, and the eighth element is an end point of the fourth group.

Furthermore, for example, it is assumed that a classification destination vector is [f] and [f] is represented by the following Expression:

$[f] = (1,2,1,2,2,1,2,2)^T$

In this case, the classification destination vector [f] indicates that the classification destination of the first element of the data vector [v] is 1 and the classification destination of the second classification destination is 2 when classifying into smaller groups within the current group. Similarly, it is represented that a classification destination of the third element is 1, a classification destination of the fourth element is 2, a classification destination of the fifth element is 2, a classification destination of the sixth element is 1, a classification destination of the seventh element is 2, and a classification destination of the eighth element is 2.

The input unit 101 inputs a data vector composed of a plurality of elements to be classified into secret groups and a group information vector representing a current grouping of the plurality of elements. Furthermore, the input unit 101 inputs a classification destination vector representing a classification destination when classifying into a finer group within the group of the plurality of elements.

The vector calculation unit 102 calculates a detection vector which detects the last element of each classification destination (that is, an element which becomes an end point (boundary) at each classification destination) in each group using the data vector, group information vector, and classification destination vector.

The stable sort unit 103 stably sorts the data vector and the detection vector by the classification destination vector. Thus, a classified data vector in which each element of the data vector is classified into a finer group in the group and a classified group information vector representing the grouping (that is, grouping in a finer group) are obtained.

The output unit 104 outputs the classified data vector and the classified group information vector. Note that the output unit 104 may output the classified data vector and the classified group information vector to an arbitrary output destination (for example, a storage unit 105 or the like) determined in advance.

<Hardware Configuration>

Figure 2:
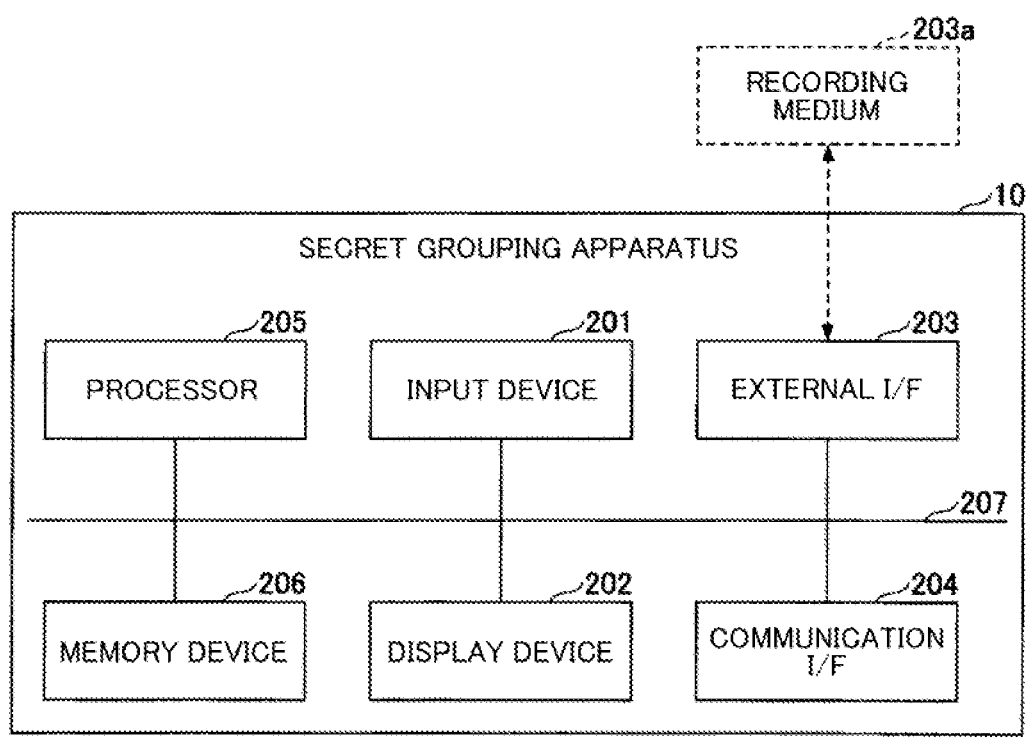
FIG. 2 is a diagram showing an example of a hardware configuration of the secret grouping apparatus according to the embodiment.

A hardware configuration of the secret grouping apparatus 10 according to the embodiment will be described below with reference to FIG. 2. FIG. 2 is a diagram showing an example of the hardware configuration of the secret grouping apparatus 10 according to the embodiment.

As shown in FIG. 2, the secret grouping apparatus 10 according to the embodiment is realized using a hardware configuration of a general computer or a computer system and includes an input device 201, a display device 202, an external I/F 203, a communication I/F 204, a processor 205, and a memory device 206. Each of these hardware is communicably connected via a bus 207.

The input device 201 is, for example, a keyboard, a mouse, a touch panel, or the like. The display device 202 is, for example, a display or the like. Note that the secret grouping apparatus 10 may not have, for example, at least one of the input device 201 and the display device 202.

The external I/F 203 is an interface with an external device such as a recording medium 203*a*. The secret grouping apparatus 10 can read or write the recording medium 203*a* via the external I/F 203. For example, one or more programs which realize each function unit (input unit 101, vector calculation unit 102, stable sort unit 103, and output unit 104) included in the secret grouping apparatus 10 may be stored in the recording medium 203a.

Note that the recording medium 203a includes, for example, a compact disc (CD), a digital versatile disk (DVD), a secure digital (SD) memory card (secure digital memory card), a universal serial bus (USB) memory card, and the like.

The communication I/F 204 is an interface for connecting the secret grouping apparatus 10 to the communication network. Note that one or more programs which realize each function unit of the secret grouping apparatus 10 may be acquired (downloaded) from a predetermined server device or the like via the communication I/F 204.

The processor 205 is, for example, various arithmetic units such as a central processing unit (CPU) and a graphics processing unit (GPU). Each function unit included in the secret grouping apparatus 10 is realized by, for example, a process of causing the processor 205 to execute one or more programs stored in the memory device 206 or the like.

The memory device 206 is, for example, various storage devices such as a hard disk drive (HDD), a solid state drive (SSD), a random access memory (RAM), a read only memory (ROM), and a flash memory. The storage unit 105 included in the secret grouping apparatus 10 can be realized by using, for example, the memory device 206. Note that the storage unit 105 may be realized by using, for example, a storage device connected to the secret grouping apparatus 10 via a communication network or the like.

The secret grouping apparatus 10 according to the embodiment can realize various processes by having the hardware configuration shown in FIG. 2. Note that the hardware configuration shown in FIG. 2 is an example and the secret grouping apparatus 10 may have another hardware configuration. For example, the secret grouping apparatus 10 may have a plurality of processors 205 or a plurality of memory devices 206.

<Secret Grouping Process>

Figure 3:
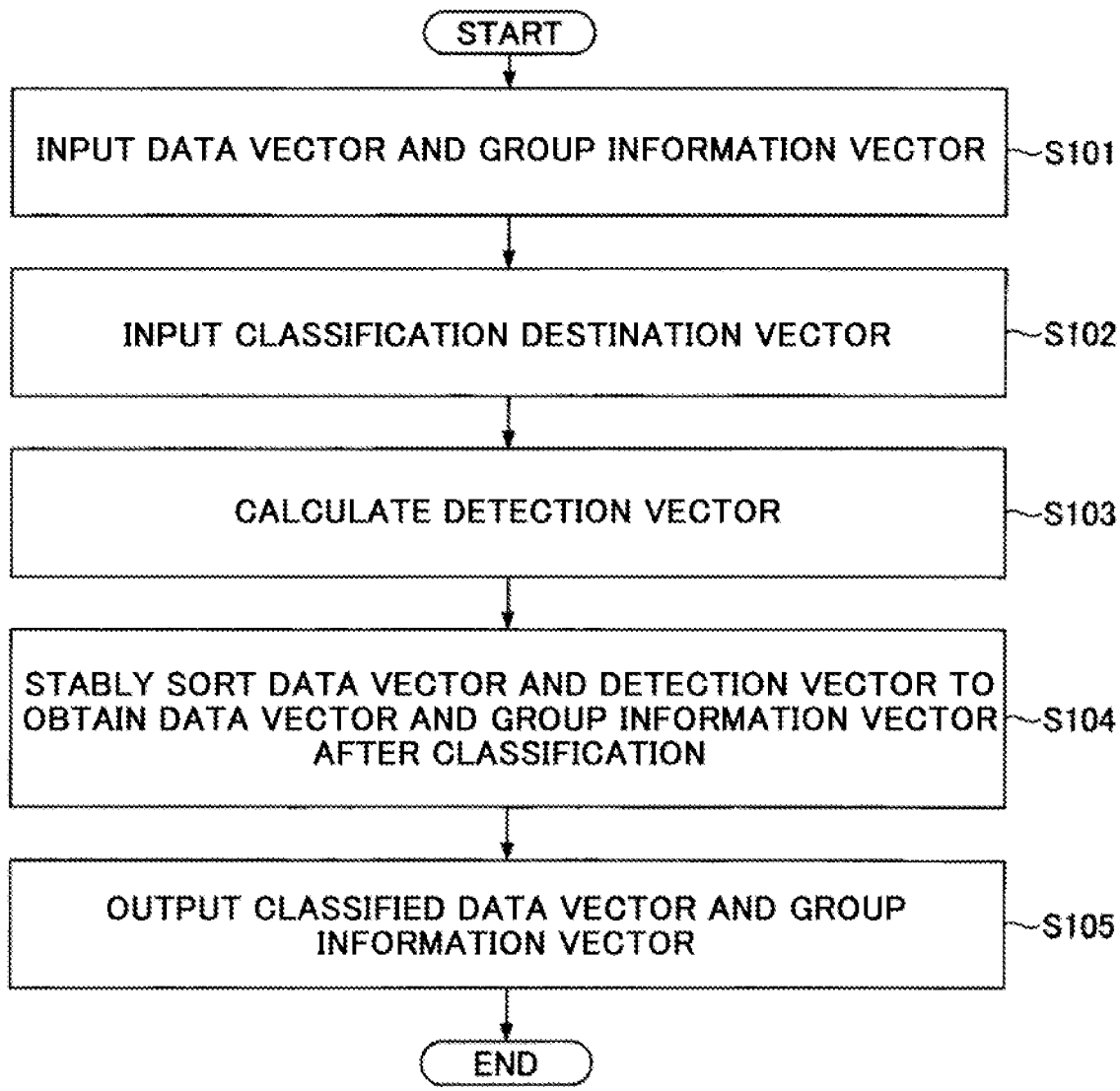
FIG. 3 is a flowchart for describing an example of a flow of a secret grouping process according to the embodiment.

A secret grouping process when each of these elements is secret-grouped into smaller groups assuming that each element of the data vector is secretly grouped will be described below with reference to FIG. 3. FIG. 3 is a flowchart showing an example of the flow of the secret grouping process according to the embodiment. Note that the following secret grouping process may be performed on the assumption that each of these elements is grouped into one group when each element of the data vector has not yet been grouped (that is, for the first time secret grouping). In this case, the group information vector is a vector in which only the last element is 1 and the other elements are 0.

First, the input unit 101 inputs the data vector and the group information vector (Step S101). Hereinafter, as an example, it is assumed that the data vector is $[v]=(3,2,4,5,1,6,3,2)^T$. Further, it is assumed that the group information vector is $[g]=(0,1,1,0,0,1,0,1)^T$.

Subsequently, the input unit 101 inputs the classification destination vector (Step S102). Hereinafter, as an example, it is assumed that the classification destination vector is $[f]=(1,2,1,2,2,1,2,2)^T$.

Subsequently, the vector calculation unit 102 calculates a detection vector used for detecting an element which is an end point of each classification destination in each group among each element of the data vector (Step S103). This detection vector is calculated by the following Steps 1 and 2.

Procedure 1: a classification destination unit detection vector used for detecting an element which is an end point of the classification destination in the same group is calculated for each value that can be taken as a classification destination. The classification destination unit detection vector is a vector in which the element at the same position as the element at the end point of the classification destination is 1 and the other elements are 0 in the same group, among the elements of the data vector.

For example, when the value which can be taken as the classification destination is "2", the vector calculation unit 102 first calculates $[e_2] \leftarrow EQ([f], 2)$ and obtains the following $[e_2]$:

$$[e_2]=(0,1,0,1,1,0,1,1)^T.$$

Subsequently, the vector calculation unit 102 calculates the cumulative sum from the bottom in the group represented by the group information vector [g] and obtains the following $[x_2]$:

$$[x_2]=(1,1,0,2,1,0,2,1)^T.$$

Note that calculating the cumulative sum from the bottom in a group means calculating the cumulative sum from the bottom element (last element) toward the top element (first element) in the group.

Subsequently, the vector calculation unit 102 obtains the following $[k_2]$ by $[e_2] \times [x_2]$:

$$[k_2]=(0,1,0,2,1,0,2,1)^T.$$

Also, the vector calculation unit 102 calculates $[t_2] \leftarrow EQ([k_2], 1)$ and obtains the following $[t_2]$:

$$[t_2]=(0,1,0,0,1,0,0,1)^T.$$

This $[t_2]$ is a classification destination unit detection vector corresponding to the classification destination "2". The classification destination unit detection vector $[t_2]$ is a vector in which the end points (that is, the last element) of the elements classified into the classification destination "2" in each group among the elements of the data vector are detected. That is to say, it is represented that, in the above classification destination unit detection vector $[t_2]$, the second element of the data vector [v] is the last element (that is, the end point) of the element classified into the classification destination "2" in the first group. Similarly, it is represented that the fifth element of the data vector [v] is the last element of the element classified into the classification destination "2" in the third group. Similarly, it is represented that the eighth element of the data vector [v] is the last element of the element classified into the classification destination "2" in the fourth group.

Similarly, for example, when the value that can be taken as the classification destination is "1", the vector calculation unit 102 first calculates $[e_1] \leftarrow EQ([f], 1)$ and obtains the following $[e_1]$:

$$[e_1]=(1,0,1,0,0,1,0,0)^T.$$

Subsequently, the vector calculation unit 102 calculates the cumulative sum from the bottom in the group represented by the group information vector [g] and obtains the following $[x_1]$:

$$[x_1]=(1,0,1,1,1,1,0,0)^T.$$

Subsequently, the vector calculation unit 102 obtains the following $[k_1]$ by $[e_1] \times [x_1]$:

$$[k_1]=(1,0,1,0,0,1,0,0)^T.$$

Also, the vector calculation unit 102 calculates $[t_1] \leftarrow EQ([k_1], 1)$ and obtains the following $[t_1]$.

$$[t_1]=(1,0,1,0,0,1,0,0)^T.$$

This $[t_1]$ is a classification destination unit detection vector corresponding to the classification destination "1". The classification destination unit detection vector $[t_1]$ is a vector in which the end points (that is, the last element) of the elements classified into the classification destination "1" in each group among the elements of the data vector are detected. That is to say, it is represented that, in the above classification destination unit detection vector $[t_1]$, the first element of the data vector [v] is the last element (that is, an end point) of the elements classified into the classification destination "1" in the first group. Similarly, it is represented that the third element of the data vector [v] is the last element of the element classified into the classification destination "1" in the second group. Similarly, it is represented that the sixth element of the data vector [v] is the last element of the element classified into the classification destination "1" in the third group.

Procedure 2: the sum of all classification destination unit detection vectors is calculated as the detection vector.

That is to say, for example, the vector calculation unit 102 obtains the following detection vector [t] by $[t]=[t_1]+[t_2]$ when the above classification destination unit detection vectors $[t_1]$ and $[t_2]$ are obtained:

$$[t]=(1,1,1,0,1,1,0,1)^T.$$

This detection vector [t] is a vector in which the elements which are the end points of the classification destinations "1" and "2" in each group are detected among the elements of the data vector.

Subsequently, the stable sort unit 103 stably sorts the data vector and the detection vector by the classification destination vector, respectively, and obtains the classified data vector and the group information vector (Step S104).

That is to say, for example, the stable sort unit 103 stably sorts the data vector [v] in ascending order of the elements of the classification destination vector [f] to obtain the following [v']:

$$[v']=(3,4,6,2,5,1,3,2)^T.$$

This [v'] is the data vector after classification.

Similarly, for example, the stable sort unit 103 stably sorts the detection vector [t] in ascending order of the elements of the classification destination vector [f] to obtain the following [g']:

$$[g']=(1,1,1,1,0,1,0,1)^T.$$

This [g'] is the group information vector after classification.

Also, the output unit 104 outputs the classified data vector and the classified group information vector (Step S105).

<Summary>

As described above, the secret grouping apparatus 10 according to the embodiment holds the grouped elements at continuous positions and also holds information indicating the boundaries of each group when a plurality of elements are grouped through secret calculation. Also, when classifying into a smaller group is performed, information representing the boundaries of a new finer group can be obtained by detecting the end points of each classification destination in each group and then stably sorting the detection results according to the classification destination. Thus, the secret grouping apparatus 10 according to the embodiment can reduce the calculation time when grouping a plurality of elements through secret calculation. Specifically, when elements of the vector composed of n number of elements are grouped through secret calculation, the calculation time of $\Theta(n^2)$ is required as a whole in the related art, whereas reduction to $\Theta(n \log n)$ is possible in the secret grouping apparatus 10 according to the embodiment. Note that, for example, the secret grouping apparatus 10 according to the embodiment can be applied to grouping of data sets at each node when learning a decision tree through secret calculation.

The present invention is not limited to the above-described embodiments specifically described and can be variously modified, changed, combined with known techniques, and the like without departing from the claims.

REFERENCE SIGNS LIST 10 secret grouping apparatus
101 input unit
102 vector calculation unit
103 stable sort unit
104 output unit
105 storage unit
201 input device
202 display device
203 external I/F
203a Recording medium
204 communication I/F
205 processor
206 memory device
207 bus

The invention claimed is:

1. A secret grouping apparatus which classifies a plurality of elements into one or more groups through secret calculation, comprising:
   a memory; and
   a processor coupled to the memory and configured to
   receive, as an input, a target vector in which the plurality of elements are disposed so that elements belonging to a same group are continuous, a group information vector representing a last element in the group, and a classification destination vector representing a classification destination of each of the elements in the group;
   calculate a detection vector representing a last element of elements classified into a same classification destination in the group by using the target vector, the group information vector, and the classification destination vector; and
   stably sort the target vector and the detection vector with respect to the classification destination vector to create a target vector after classifying each of the elements into the classification destination in the group and a group information vector representing a last element in a group after the classification.

2. The secret grouping apparatus according to claim 1, wherein the group information vector is a vector in which an element at a same position as a last element of elements belonging to the same group among elements constituting the target vector is 1 and an element other than the element at the same position as the last element is 0.

3. The secret grouping apparatus according to claim 1, wherein the processor is further configured to
   calculate, for each of values which are able to be taken as classification destinations, a classification destination unit detection vector representing a last element among elements classified into a classification destination corresponding to a value which is able to be taken in the group, and
   calculate the detection vector by calculating a sum of classification destination unit detection vectors for all of the values which are able to be taken.

4. The secret grouping apparatus according to claim 3, wherein the processor is further configured to
- calculate a first vector representing a result of a comparison operation by performing the comparison operation between elements constituting the classification destination vector and the value which is able to be taken,
- calculate a second vector by calculating a cumulative sum of elements constituting the first vector in order from a last element to a first element in the group,
- calculate a third vector by calculating a product of the first vector and the second vector, and
- calculate the classification destination unit detection vector by performing a comparison operation between each element constituting the third vector and 1.

5. A secret grouping system which classifies a plurality of elements into one or more groups through secret calculation, comprising:
- a memory; and
- a processor coupled to the memory and configured to
- receive, as an input, a target vector in which the plurality of elements are disposed so that elements belonging to a same group are continuous, a group information vector representing a last element in the group, and a classification destination vector representing a classification destination of each of the elements in the group;
- calculate a detection vector representing a last element of elements classified into a same classification destination in the group by using the target vector, the group information vector, and the classification destination vector; and
- stably sort the target vector and the detection vector with respect to the classification destination vector to create a target vector after classifying each of the elements into the classification destination in the group and a group information vector representing a last element in a group after the classification.

6. A secret grouping method performed by a computer in which a plurality of elements are classified into one or more groups through secret calculation, the secret grouping method comprising:
- receiving, as an input, a target vector in which the plurality of elements are disposed so that elements belonging to a same group are continuous, a group information vector representing a last element in the group, and a classification destination vector representing a classification destination of each of the elements in the group;
- calculating a detection vector representing a last element of elements classified into a same classification destination in the group by using the target vector, the group information vector, and the classification destination vector; and
- stably sorting the target vector and the detection vector with respect to the classification destination vector to create a target vector after classifying each of the elements into the classification destination in the group and a group information vector representing a last element in a group after the classification.

7. A non-transitory computer-readable recording medium storing a program causing a computer to function as the secret grouping apparatus according to claim 1.

* * * * *